United States Patent
Zhang et al.

(10) Patent No.: US 10,539,823 B2
(45) Date of Patent: Jan. 21, 2020

(54) COMPENSATING METHOD AND SYSTEM FOR CELL ASSEMBLY

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Xiaohua Zhang, Beijing (CN); Xiahong Bai, Beijing (CN); Dong Yan, Beijing (CN); Hao Lei, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 218 days.

(21) Appl. No.: 15/677,123

(22) Filed: Aug. 15, 2017

(65) Prior Publication Data
US 2018/0074366 A1    Mar. 15, 2018

(30) Foreign Application Priority Data
Sep. 14, 2016  (CN) .......................... 2016 1 0827013

(51) Int. Cl.
*G06F 17/50*  (2006.01)
*G02F 1/1335*  (2006.01)

(52) U.S. Cl.
CPC .. *G02F 1/133512* (2013.01); *G02F 1/133514* (2013.01)

(58) Field of Classification Search
CPC ......... G02F 1/133509; G02F 1/133512; G02F 1/133514; G02F 1/136209; G02F 2001/133514
USPC ...................................................... 716/52–55
See application file for complete search history.

(56) References Cited

U.S. PATENT DOCUMENTS

| 2010/0142069 A1* | 6/2010 | Nakamura ........ G02F 1/133512 359/885 |
| 2012/0081640 A1* | 4/2012 | Kim .................. G02F 1/133514 349/106 |

FOREIGN PATENT DOCUMENTS

CN    103676284 A    3/2014

* cited by examiner

*Primary Examiner* — Paul Dinh
(74) *Attorney, Agent, or Firm* — Calfee, Halter & Griswold LLP (57) ABSTRACT

The present disclosure relates to compensating method for cell assembly. According to a deviation value of a key position of a measured array substrate, a compensation value of an exposure parameter of black matrix process of a color film substrate is calculated in real time by using historical measurement data of batches. The compensation value is fed back to a manufacturing apparatus in real time. The manufacturing apparatus corrects the key parameter of the apparatus timely according to the compensation value of the exposure parameter of the black matrix, to manufacture a color film substrate matching with the array substrate.

20 Claims, 5 Drawing Sheets

COMPENSATING METHOD AND SYSTEM FOR CELL ASSEMBLY

CROSS-REFERENCES TO RELATED APPLICATIONS

This application claims priority to Chinese Patent Application No. 201610827013.5 filed in China on Sep. 14, 2016, the entire contents of which are hereby incorporated by reference.

TECHNICAL FIELD

The present disclosure relates to the field of display technology and, more particularly, to a compensating method and system for cell assembly.

BACKGROUND

In the prior art, in preparation process of a liquid crystal display, since substrate deformation of an array substrate and a color film substrate is different during the process, there is inevitably alignment deviation in the cell assembly process. The alignment deviation will cause cross color defect and light leakage defect, which has a great impact on the display effect of the product. In order to improve the product quality of a liquid crystal display product, it is necessary to reduce the alignment deviation as much as possible.

It should be noted that, information disclosed in the above background portion is provided only for better understanding of the background of the present disclosure, and thus it may contain information that does not form the prior art known by those ordinary skilled in the art.

SUMMARY

The embodiments of the present disclosure provide a compensating method and system for cell assembly.

The embodiments of the present disclosure provide a compensating method for cell assembly of a first substrate and a second substrate, wherein a black matrix is provided on the second substrate, the method including: acquiring identification data and measurement data of the first substrate and the second substrate of each batch, wherein the measurement data includes a deviation value of a key position of the first substrate of each batch, a deviation value of a key position of the second substrate of each batch, a deviation value of a key position of the black matrix on the second substrate of each batch, and a measurement value of alignment precision after alignment of the first substrate and the second substrate; calculating the acquired measurement data and determining a compensation value of an exposure parameter of the black matrix on the second substrate to be manufactured; and preparing the second substrate to be manufactured by using an exposure parameter compensated by the compensation value of the exposure parameter.

The embodiments of the present disclosure provide a compensating system for cell assembly, including: a data acquiring circuit, a data analyzing circuit and a data applying circuit, wherein the data acquiring circuit is configured to acquire identification data and measurement data of the first substrate and the second substrate of each batch, wherein the measurement data includes a deviation value of a key position of the first substrate of each batch, a deviation value of a key position of the second substrate of each batch, a deviation value of a key position of the black matrix on the second substrate of each batch, and a measurement value of alignment precision after alignment of the first substrate and the second substrate; the data analyzing circuit is configured to calculate the measurement data acquired by the data acquiring circuit and determining a compensation value of an exposure parameter of the black matrix on the second substrate to be manufactured; and the data applying circuit is configured to prepare the second substrate to be manufactured by using an exposure parameter compensated by the compensation value of the exposure parameter.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

DETAILED DESCRIPTION

Hereinafter, a specific implementation of the compensating method and system for cell assembly (e.g., a method and a system for compensating the precision of the cell assembly) provided by the present embodiment of the present disclosure will be described in detail with reference to the accompanying drawings.

In the present disclosure, an embodiment of the present disclosure is illustrated by taking an array substrate and a color film substrate as an example. However, it should be understood that the embodiments of the present disclosure are not limited to the array substrate and the color film substrate, but may be applied to the cell assembly precision compensation for substrates of other forms.

Figure 1:
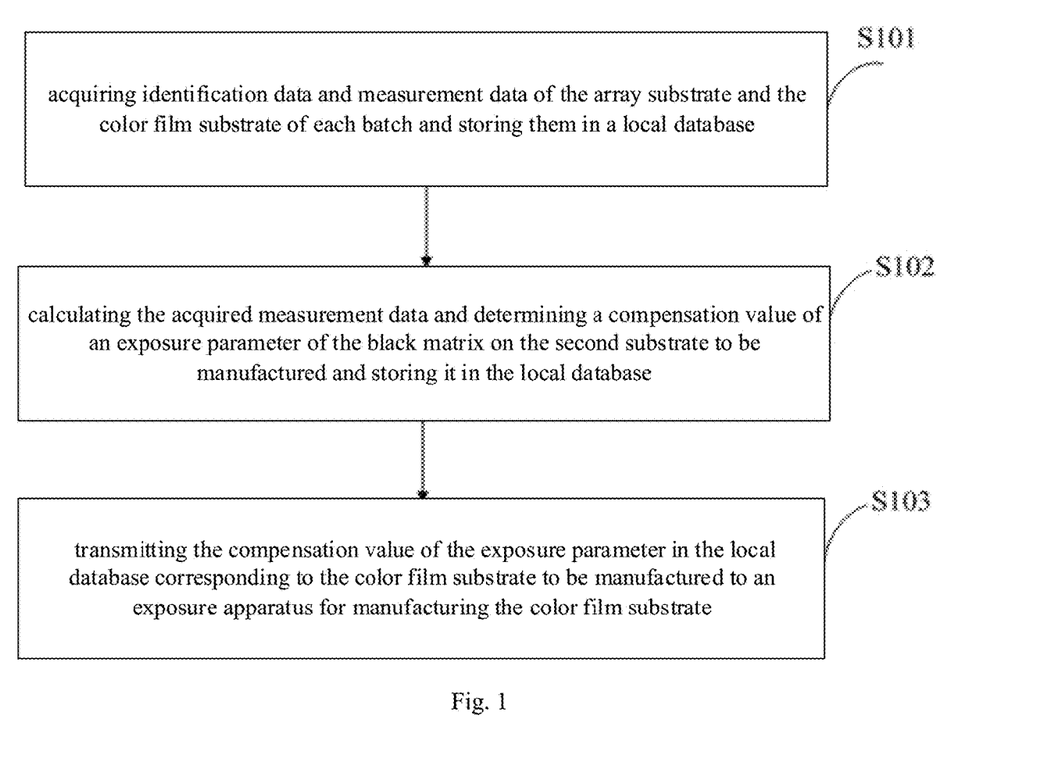
FIG. 1 is a flow chart of a compensating method for cell assembly provided by the embodiment of present disclosure.

The embodiment of the present disclosure provides a compensating method for cell assembly precision, as shown in FIG. 1, which may specifically include following steps.

S101, identification data and measurement data of the array substrate and the color film substrate of each batch are acquired and stored in a local database.

In the embodiment, the measurement data includes a deviation value of a key position of the array substrate of each batch, a deviation value of a key position of the color film substrate of each batch, a deviation value of a key position of the black matrix on the color film substrate of each batch, and a measurement value of alignment precision after alignment of the array substrate and the color film substrate.

S102, the acquired measurement data is calculated and a compensation value of an exposure parameter of the black matrix on the second substrate to be manufactured is determined and the above compensation value of an exposure parameter is stored in the local database.

S103, the compensation value of the exposure parameter in the local database corresponding to the color film substrate to be manufactured is transmitted to an exposure apparatus for manufacturing the color film substrate.

In the present embodiment, the acquired measurement data and the compensation value determined by calculation are stored in the local database. However, the present disclosure is not limited thereto, and the measurement data and the compensation value may also be stored in a network database, or a combination of the local database and the network database. In addition, it will be understood by those skilled in the art that in other embodiments of the present disclosure, other data storage and transmission schemes may be used without using the database. Corresponding data storage and transmission modes are known to those skilled in the art and will not be described herein for sake of brevity.

In addition, it should be noted that step S103 specifically recites that he compensation value of the exposure parameter corresponding to the color film substrate to be manufactured in the local database is transmitted to an exposure apparatus for manufacturing the color film substrate. However, it should be understood that this disclosure is not limited to transmitting only the compensation value of the exposure parameter to the exposure apparatus, but other data, for example, an exposure parameter compensated by the compensation value of the exposure parameter may also be transmitted to the exposure apparatus. In other words, the concept of the present disclosure can be satisfied, as long as the color film substrate to be manufactured may be prepared by using the exposure parameter compensated by the compensation value of the exposure parameter.

In the above compensating method provided by the embodiment of the present disclosure, in order to improve the alignment precision of the color film substrate and the array substrate, a black matrix process may be performed on the color film substrate after an array process on an array substrate paired with the color film substrate is completed and a deviation value of a key position of the array substrate is measured. Specifically, when the color film substrate is ready for the process on an exposure apparatus of the black matrix, a basic information request is sent by a programmable logic controller at the apparatus side. An automatically compensating cell alignment precision system will send the calculated compensation value of the exposure parameter to be the programmable logic controller of the apparatus. The exposure apparatus of the black matrix preforms the black matrix process on the color film substrate based on this parameter.

Figure 2:
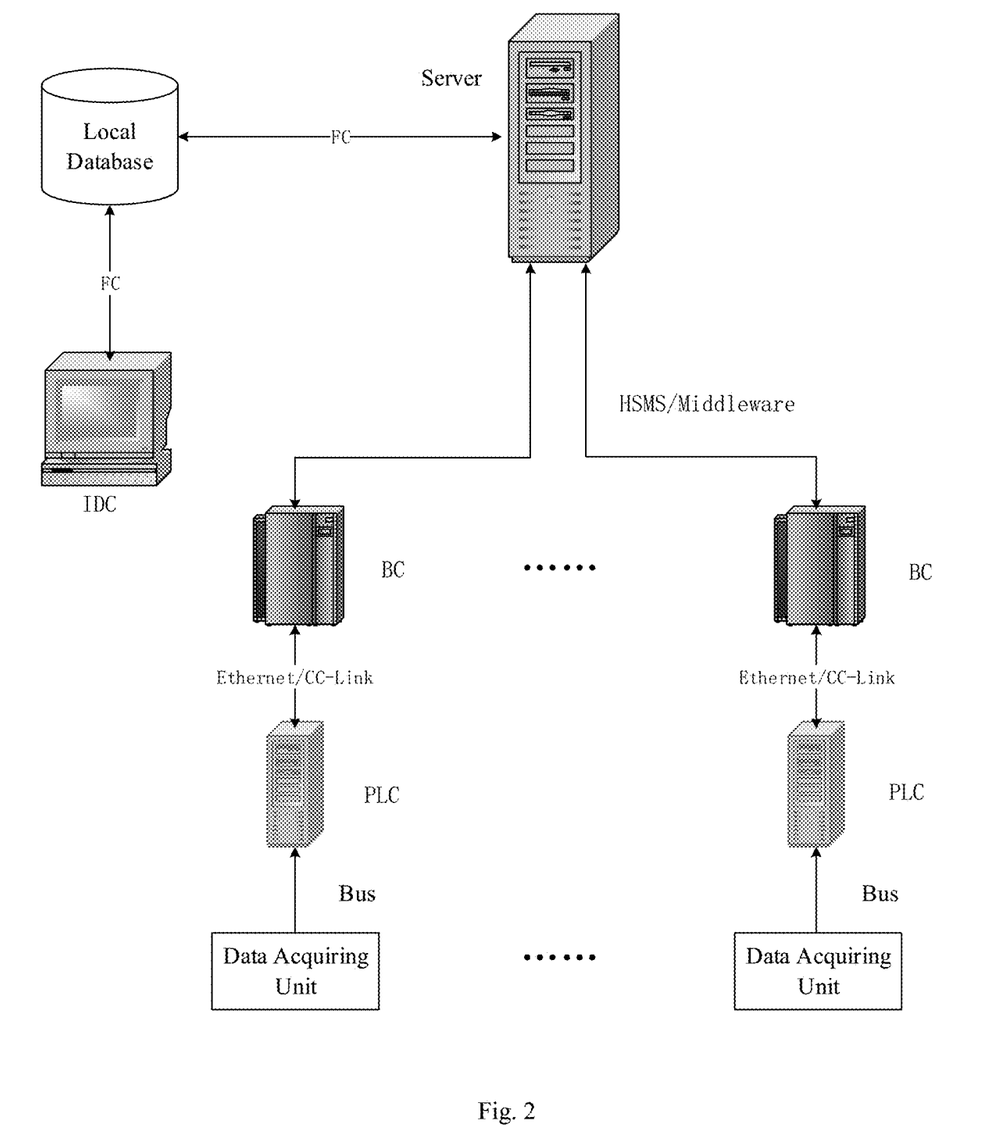
FIG. 2 is a schematic diagram of data transmission between an apparatus and a data center provided by the embodiment of present disclosure.

In addition, as shown in FIG. 2, a data acquiring unit, i.e. a data acquiring module, is installed at the apparatus side, and the data acquiring module is connected to the built-in programmable logic controller PLC of the apparatus through a bus transmission mode. Dynamic data of the apparatus acquired by the programmable logic controller PLC of the apparatus side is sent to a transmission unit BC via Ethernet or control network CC-Link IE. The transmission unit BC sends the data to a server of a monitoring system through an HSMS protocol or a message middleware, and sorts various kinds of data to store them in the local database. The local database will upload the data to a data center IDC. The server and the local database are connected through optical fiber link, and the local database and the data center IDC are connected through the optical fiber link. In this way, it may not only acquire and store the measurement data for calculating the compensation value of the exposure parameter of the black matrix on the color film substrate to be manufactured and the calculation result, but also transmit the calculated compensation value of the exposure parameter to the exposure apparatus for manufacturing the color film substrate, to achieve the compensation for the alignment precision in the preparation process.

In a specific implementation, in the above-described compensating method provided by the embodiment of the present disclosure, the step S102 may specifically include:

extracting from the local database measurement data for calculating the compensation value of the exposure parameter of the black matrix on the color film substrate to be manufactured, setting a standard value range of the deviation value of the key position and a standard value range of alignment precision corresponding to the array substrate and the color film substrate, judging whether the measurement data for calculation is within a standard value range according to the standard value range of the deviation value of the key position and the standard value range of alignment precision, and outputting a judging result; and calculating the extracted measurement data, and calculating the compensation value of the exposure parameter of the black matrix on the color film substrate to be manufactured according to the judging result, and storing the calculation result in the local database.

Specifically, in order to improve the alignment precision of the array substrate and the color film substrate, and to achieve the compensation of alignment deviation in the preparation process, the measurement data for calculation needs to be extracted and filtered, and a final compensation parameter is obtained through calculation according to the filtered measurement data. Specifically, the data extraction, filtering and calculation are as follows:

a first data extraction and filtering: extracting from the local database the deviation value of the key position of the array substrate of the $(n+1)^{th}$ batch, an exponentially weighted moving average offset of the compensation value of the key position of the color film substrate of the $(n-1)^{th}$ batch, the deviation value of the key position of the array substrate and the color film substrate of the $n^{th}$ batch, judging whether the extracted deviation value of the key position of the array substrate and the color film substrate of the $n^{th}$ batch and the measurement value of alignment precision after forming a cell assembly of the array substrate and the color film substrate of the $n^{th}$ batch are within the standard value range according to the standard value range of the deviation value of the key position and the standard value range of alignment precision, and outputting the judging result;

if the deviation value of the key position of the array substrate and the color film substrate of the $n^{th}$ batch is within the standard value range of the deviation value of the key position and the measurement values of alignment precision after forming a cell assembly of the array substrate and the color film substrate of the $n^{th}$ batch are within the standard value range of alignment precision, obtaining the compensation value of the key position of the color film substrate of the $(n+1)^{th}$ batch by following calculation processes and storing the calculation result in the local database:

$$\Delta TP_{TFT \to CF}(n) = TP_{TFTFinal}(n) - TP_{CFFinal}(n);$$

$$\Delta TP_{TFT \to CF}(n)_{EWMA} = (1-\alpha)\Delta TP_{TFT \to CF}(n-1)_{EWMA} + \alpha \Delta TP_{TFT \to CF}(n), \ 0 \le \alpha \le 1;$$

$$TP_{CFFinal}(n+1) = TP_{TFTFinal}(n+1) + \Delta TP_{TFT \to CF}(n)_{EWMA}, \ n=1,2,3,\ldots.$$

if the deviation value of the key position of the array substrate and the color film substrate of the $n^{th}$ batch is beyond the standard value range of the deviation value of the key position, or the measurement values of alignment precision after forming a cell assembly of the array substrate and the color film substrate of the $n^{th}$ batch are beyond the standard value range of alignment precision, obtaining the compensation value of the key position of the color film substrate of the $(n+1)^{th}$ batch by the following calculation process and storing the calculation result in the local database:

$$TP_{CFFinal}(n+1)=TP_{TFTFinal}(n+1)+\Delta TP_{TFT \to CF}(n-1)_{EWMA}, n=1,2,3,\ldots.$$

wherein $TP_{TFTFinal}(n)$ is the deviation value of the key position of the array substrate of the $n^{th}$ batch, $TP_{CFFinal}(n)$ is the deviation value of the key position of the color film substrate of the $n^{th}$ batch, $\Delta TP_{TFT \to CF}(n)$ is an offset of the compensation value of the array substrate and the color film substrate of the $n^{th}$ batch, $\Delta TP_{TFT \to CF}(n-1)_{EWMA}$ is the exponentially weighted moving average offset of the compensation value of the key position of the color film substrate of the $(n-1)^{th}$ batch, $\Delta TP_{TFT \to CF}(n)_{EWMA}$ is an exponentially weighted moving average offset of the compensation value of the key position of the color film substrate of the $n^{th}$ batch, $TP_{TFTFinal}(n+1)$ is the deviation value of the key position of the array substrate of the $(n+1)^{th}$ batch, and $TP_{CFFinal}(n+1)$ is deviation value of the key position of the color film substrate of the $(n+1)^{th}$ batch;

a second data extraction and filtering: extracting from the local database the deviation value of the key position of the color film substrate of the $n^{th}$ batch, the deviation value of the key position of the black matrix on the color film substrate of the $n^{th}$ batch, an exponentially weighted moving average offset of the compensation value of the key position of the black matrix on the color film substrate of the $(n-1)^{th}$ batch, judging whether the extracted deviation value of the key position of the color film substrate of the $n^{th}$ batch the and the extracted deviation value of the key position of the black matrix on the color film substrate of the $n^{th}$ batch are within the standard value range according to the standard value range of the deviation value of the key position, and outputting the judging result;

if the deviation value of the key position of the color film substrate of the $n^{th}$ batch and the deviation value of the key position of the black matrix on the color film substrate of the $n^{th}$ batch are within the standard value range of the deviation value of the key position, obtaining the compensation value of the exposure parameter of the black matrix on the color film substrate of the $(n+1)^{th}$ batch by following calculation processes and storing the calculation result in the local database:

$$\Delta TP_{Final \to BM}(n)=TP_{CFFinal}(n)-TP_{CFBM}(n);$$

$$\Delta TP_{Final \to BM}(n)_{EWMA}=(1-\alpha)\Delta TP_{Final \to BM}(n-1)_{EWMA}+\alpha\Delta TP_{Final \to BM}(n), 0\leq\alpha\leq1;$$

$$TP_{CFBM}(n+1)=TP_{CFFinal}(n+1)-\Delta TP_{Final \to BM}(n)_{EWMA}, n=1,2,3,\ldots.$$

if the deviation value of the key position of the color film substrate of the $n^{th}$ batch or the deviation value of the key position of the black matrix on the color film substrate of the $n^{th}$ batch is beyond the standard value range of the deviation value of the key position, obtaining the compensation value of the exposure parameter of the black matrix on the color film substrate of the $(n+1)^{th}$ batch by the following calculation process and storing the calculation result in the local database:

$$TP_{CFBM}(n+1)=TP_{CFFinal}(n+1)-\Delta TP_{Final \to BM}(n-1)_{EWMA}, n=1,2,3,\ldots.$$

wherein $TP_{CFFinal}(n)$ is the deviation value of the key position of the color film substrate of the $n^{th}$ batch, $TP_{CFBM}(n)$ is the deviation value of the key position of the black matrix on the color film substrate of the $n^{th}$ batch, $\Delta TP_{Final \to BM}(n)$ is an offset of the compensation value of the black matrix and the color film substrate of the $n^{th}$ batch, $\Delta TP_{Final \to BM}(n-1)_{EWMA}$ is the exponentially weighted moving average offset of the compensation value of the key position of the black matrix on the color film substrate of the $(n-1)^{th}$ batch, $\Delta TP_{Final \to BM}(n)_{EWMA}$ is the exponentially weighted moving average offset of the compensation value of the key position of the black matrix on the color film substrate of the $n^{th}$ batch, and $TP_{CFBM}(n+1)$ is the compensation value of the exposure parameter of the black matrix on the color film substrate of the $(n+1)^{th}$ batch.

Figure 3:
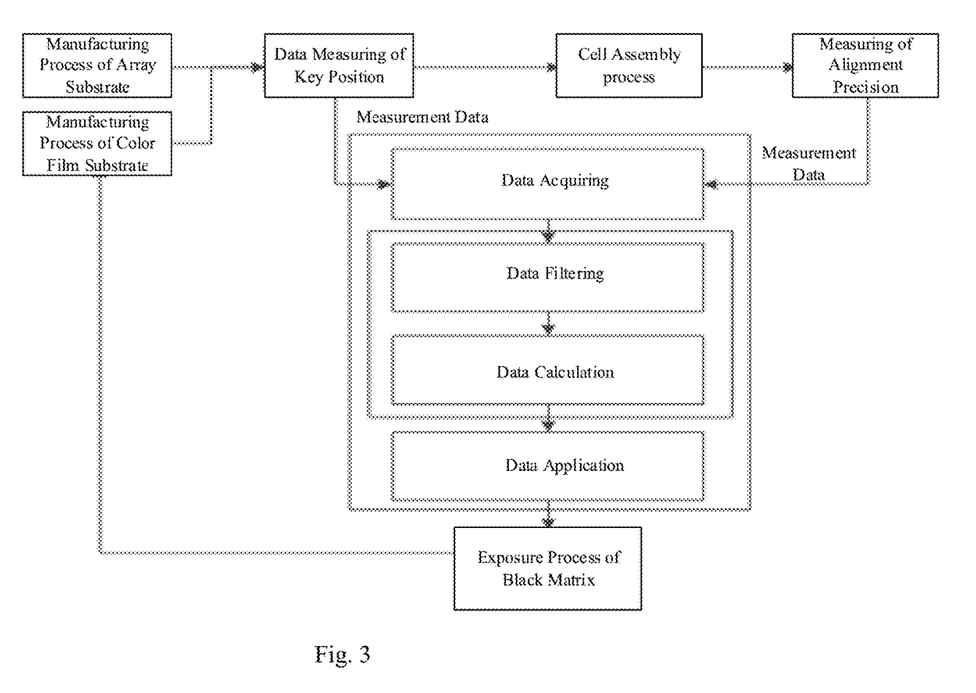
FIG. 3 is a schematic diagram of the whole preparation process of the display product provided by the embodiment of present disclosure.

In a specific implementation, in the above-described compensating method provided by the embodiment of the present disclosure, the step S103 may specifically include: matching the identification data of the array substrate with the identification data of the color film substrate to be manufactured; and based on the matching result, transmitting the compensation value of the exposure parameter in the local database corresponding to the matching result to the exposure apparatus for manufacturing the color film substrate. Specifically, the identification data may include at least one of a product batch, a product model and a product size. Specifically, as shown in FIG. 3, which shows the process from manufacturing the array substrate of the display product to forming a cell assembly of the array substrate and the color film substrate, in which the compensation process of the compensating system for cell assembly precision provided by the embodiment of the present disclosure is added, thus improving the alignment precision of the array substrate and color film substrate. The specific manufacturing process includes: the manufacturing of the array substrate; the acquiring, filtering, calculating and applying after the historical key data is measured; applying the finally calculated compensation value to the exposure process of the black matrix on the color film substrate; completing the manufacturing of the color film substrate; and performing a cell assembly process of the array substrate and color film substrate. The manufacturing process adopted in the above manufacturing process is the same as that of the prior art, which will not be described in detail herein. Unlike the prior art, the process of compensating the cell assembly precision provided by the embodiment of the present disclosure is added. The specific compensating method is described as above, and the repetition is not repeated.

Figure 4:
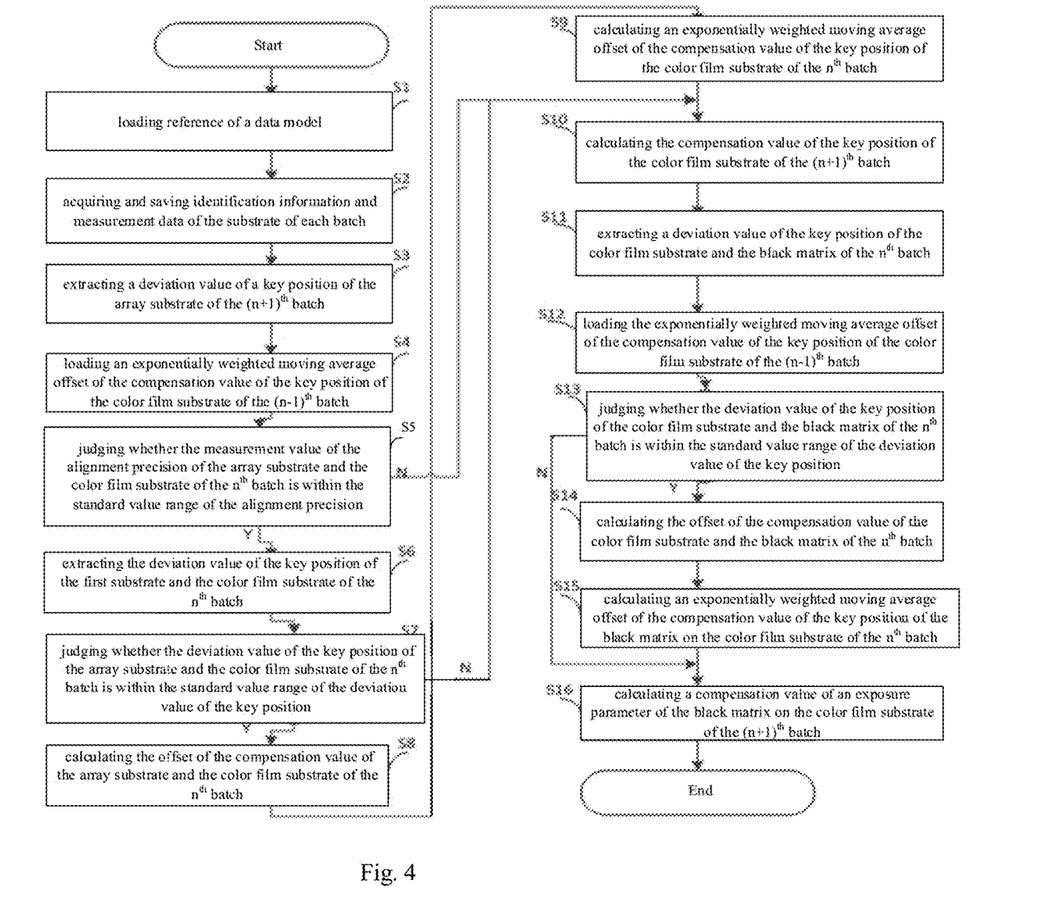
FIG. 4 is a specific flow chart of a compensating method for cell assembly provided by the embodiment of present disclosure.

The above-described compensating method provided in the embodiment of the present disclosure will be described in detail with reference to a specific operation flow embodiment, as shown in FIG. 4, specifically including following steps.

S1, reference of a data model is loaded.

S2, identification information and measurement data of the substrate of each batch are acquired and saved.

S3, a deviation value of a key position of the array substrate of the $(n+1)^{th}$ batch is extracted.

S4, an exponentially weighted moving average offset of the compensation value of the key position of the color film substrate of the $(n-1)^{th}$ batch is loaded.

S5, it is judged whether the measurement value of the alignment precision of the array substrate and the color film substrate of the $n^{th}$ batch is within the standard value range of the alignment precision. If it is, S6 is executed, otherwise, S10 is executed.

S6, the deviation value of the key position of the first substrate and the color film substrate of the $n^{th}$ batch is extracted.

S7, it is judged whether the deviation value of the key position of the array substrate and the color film substrate of the $n^{th}$ batch is within the standard value range of the deviation value of the key position. If it is, S8 is executed, otherwise, S10 is executed.

S8, the offset of the compensation value of the array substrate and the color film substrate of the $n^{th}$ batch is calculated, S9, an exponentially weighted moving average offset of the compensation value of the key position of the color film substrate of the $n^{th}$ batch is calculated.

S10, the compensation value of the key position of the color film substrate of the $(n+1)^{th}$ batch is calculated.

S11, a deviation value of the key position of the color film substrate and the black matrix of the $n^{th}$ batch is extracted.

S12, the exponentially weighted moving average offset of the compensation value of the key position of the color film substrate of the $(n-1)^{th}$ batch is loaded.

S13, it is judged whether the deviation value of the key position of the color film substrate and the black matrix of the $n^{th}$ batch is within the standard value range of the deviation value of the key position. If it is, S14 is executed, otherwise, S16 is executed.

S14, the offset of the compensation value of the color film substrate and the black matrix of the $n^{th}$ batch is calculated.

S15, an exponentially weighted moving average offset of the compensation value of the key position of the black matrix on the color film substrate of the $n^{th}$ batch is calculated.

S16, a compensation value of an exposure parameter of the black matrix on the color film substrate of the $(n+1)^{th}$ batch is calculated.

Figure 5:
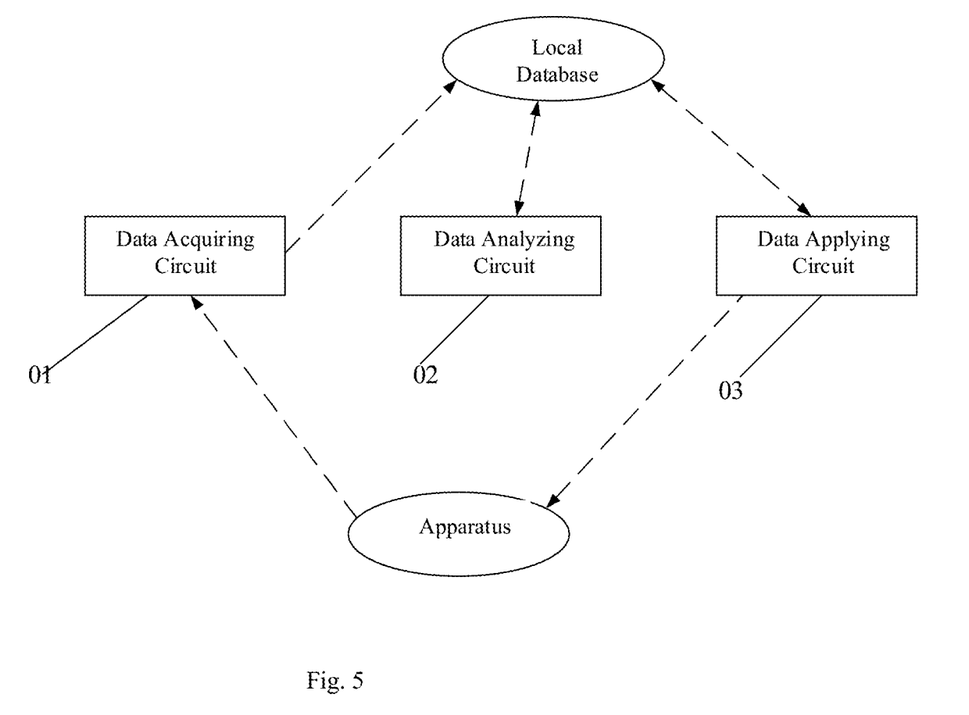
FIGS. 5 and 6 are structural schematic views of the compensating system for cell assembly provided by the embodiment of present disclosure.

Based on the same concept, as shown in FIG. 5, the embodiment of the present disclosure provides a compensating system for cell assembly precision, which may include: a data acquiring module 01, a data analyzing module 02 and a data applying module 03. In the present disclosure, the modules may be implemented with various circuits. In the embodiment, the data acquiring module 01 is configured to acquire identification data and measurement data of the array substrate and the color film substrate of each batch and store the above identification data and measurement data in local database, wherein the measurement data includes a deviation value of a key position of the array substrate of each batch, a deviation value of a key position of the color film substrate of each batch, a deviation value of a key position of the black matrix on the color film substrate of each batch, and a measurement value of alignment precision after alignment of the array substrate and the color film substrate; the data analyzing module 02 is configured to calculate the measurement data in the local database acquired by the data acquiring module and determining a compensation value of an exposure parameter of the black matrix on the color film substrate to be manufactured and store the compensation value in the local database; and the data applying module 03 is configured to transmit the compensation value of the exposure parameter in the local database corresponding to the color film substrate to be manufactured to an exposure apparatus for manufacturing the color film substrate.

The embodiment of the present disclosure provides a compensating system for cell assembly precision described above. According to a deviation value of a key position of a measured array substrate, a compensation value of an exposure parameter of black matrix process of a color film substrate is calculated in real time by using historical measurement data of batches. The compensation value is fed back to a manufacturing apparatus in real time. The manufacturing apparatus corrects the key parameter of the apparatus timely according to the compensation value of the exposure parameter of the black matrix, to manufacture a color film substrate matching with the array substrate. In this way, by predicting the alignment deviation of the color film substrate and the array substrate, its optimized feedback is compensated in the process to eliminate the alignment deviation, which may fundamentally solve the alignment defect, improve quality of the product, at the same time, it may save a lot of human consumption, and meet continuous production needs of an automated production line. It should be noted that the deviation value of the key position refers to a measurement value of dimensional deformation of each substrate, and the key position refers to a marked position in the substrate. The marked position is a plurality of mark positions which are marked at the time of design.

Figure 6:
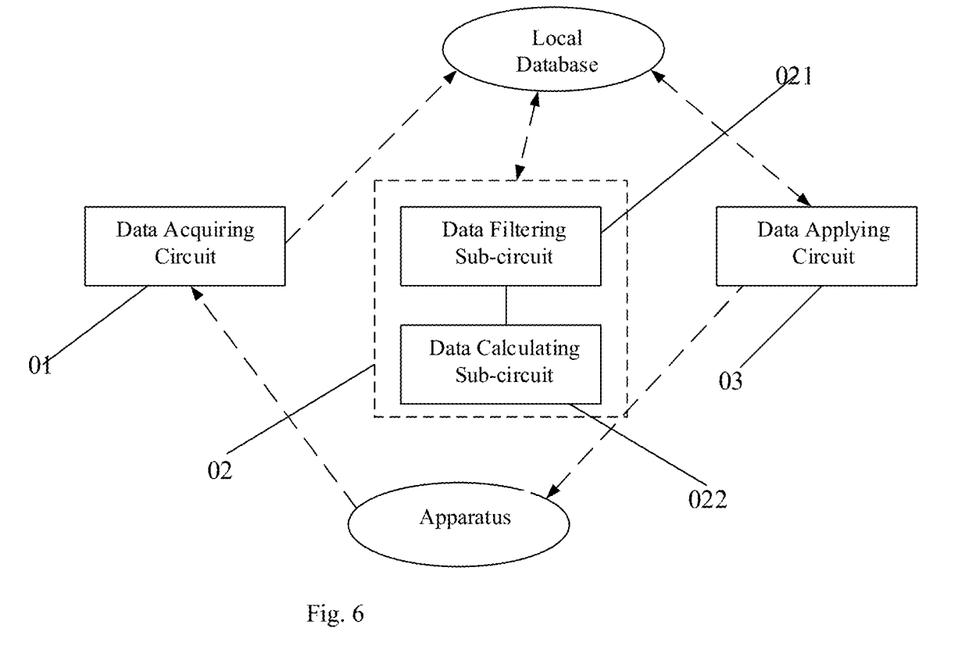

In a specific embodiment, in the above compensating system for cell assembly precision provided by the above embodiment of the present disclosure, as shown in FIG. 6, the data analyzing module 02 may include: a data filtering sub-module 021 and a data calculating sub-module 022, wherein the data filtering sub-module 021 is configured to extract from the local database measurement data for calculating the compensation value of the exposure parameter of the black matrix on the color film substrate to be manufactured, set a standard value range of the deviation value of the key position and a standard value range of alignment precision corresponding to the array substrate and the color film substrate, judge whether the measurement data for calculation is within a standard value range according to the standard value range of the deviation value of the key position and the standard value range of alignment precision, and output a judging result to the data calculating sub-module 022; and the data calculating sub-module 022 is configured to calculate the measurement data extracted by the data filtering sub-module, and calculate the compensation value of the exposure parameter of the black matrix on the color film substrate to be manufactured according to the judging result of the data filtering sub-module 021, and store the calculation result in the local database.

In a specific embodiment, in the above compensating system for cell assembly precision provided by the above embodiment of the present disclosure, the data analyzing module includes a data filtering sub-module and a data calculating sub-module, wherein the data filtering sub-module is configured to extract test data for calculation and judge whether the extracted data is within the standard value range; and the data calculating sub-module is configured to calculate the extracted test data according to the judging result, and finally obtain the compensation value of the exposure parameter of the black matrix on the color film substrate to be manufactured.

In a specific implementation, in the above compensating system for cell assembly precision provided by the above embodiment of the present disclosure, the data filtering sub-module may be configured to:

a first data extraction and filtering: extract from the local database the deviation value of the key position of the array substrate of the $(n+1)^{th}$ batch, an exponentially weighted moving average offset of the compensation value of the key positions of the color film substrate of the $(n-1)^{th}$ batch, the deviation value of the key position of the array substrate and the color film substrate of the $n^{th}$ batch, judge whether the extracted deviation value of the key position of the array substrate and the color film substrate of the $n^{th}$ batch and the measurement value of alignment precision after forming a cell assembly of the array substrate and the color film substrate of the $n^{th}$ batch are within the standard value range according to the standard value range of the deviation value of the key position and the standard value range of alignment precision, and output the judging result to the data calculating sub-module; and a second data extraction and filtering: extract from the local database the deviation value of the key position of the color film substrate of the $n^{th}$ batch, the deviation value of the key position of the black matrix on the color film substrate of the $n^{th}$ batch, an exponentially weighted moving average offset of the compensation value of the key position of the black matrix on the color film substrate of the $(n-1)^{th}$ batch, judge whether the extracted deviation value of the key position of the color film substrate of the $n^{th}$ batch the and the extracted deviation value of the key position of the black matrix on the color film substrate of the $n^{th}$ batch are within the standard value range according to the standard value range of the deviation value of the key position, and output the judging result to the data calculating sub-module.

Specifically, in the above compensating system for cell assembly precision provided by the above embodiment of the present disclosure, the data filtering sub-module may perform extracting and judging of data twice, and then the data calculating sub-module calculates the extracted test data according to the judging result of the data filtering sub-module, and finally obtains the compensation value of the exposure parameter of the black matrix on the color film substrate to be manufactured. The specific calculation process is as follows.

If the deviation value of the key position of the array substrate and the color film substrate of the $n^{th}$ batch is within the standard value range of the deviation value of the key position and the measurement values of alignment precision after forming a cell assembly of the array substrate and the color film substrate of the $n^{th}$ batch are within the standard value range of alignment precision, the compensation value of the key position of the color film substrate of the $(n+1)^{th}$ batch is obtained by following calculation processes and the calculation result is stored in the local database:

$$\Delta TP_{TFT\to CF}(n)=TP_{TFTFinal}(n)-TP_{CFFinal}(n);$$

$$\Delta TP_{TFT\to CF}(n)_{EWMA}=(1-\alpha)\Delta TP_{TFT\to CF}(n-1)_{EWMA}+\alpha\Delta TP_{TFT\to CF}(n),\ 0\leq\alpha\leq1;$$

$$TP_{CFFinal}(n+1)=TP_{TFTFinal}(n+1)+\Delta TP_{TFT\to CF}(n)_{EWMA},\ n=1,2,3,\ldots.$$

if the deviation value of the key position of the array substrate and the color film substrate of the $n^{th}$ batch is beyond the standard value range of the deviation value of the key position, or the measurement values of alignment precision after forming a cell assembly of the array substrate and the color film substrate of the $n^{th}$ batch are beyond the standard value range of alignment precision, obtain the compensation value of the key position of the color film substrate of the $(n+1)^{th}$ batch by the following calculation process and the calculation result is stored in the local database:

$$TP_{CFFinal}(n+1)=TP_{TFTFinal}(n+1)+\Delta TP_{TFT\to CF}(n-1)_{EWMA},\ n=1,2,3,\ldots.$$

wherein $TP_{TFTFinal}(n)$ is the deviation value of the key position of the array substrate of the $n^{th}$ batch, $TP_{CFFinal}(n)$ is the deviation value of the key position of the color film substrate of the $n^{th}$ batch, $\Delta TP_{TFT\to CF}(n)$ is an offset of the compensation value of the array substrate and the color film substrate of the $n^{th}$ batch, $\Delta TP_{TFT\to CF}(n-1)_{EWMA}$ is the exponentially weighted moving average offset of the compensation value of the key position of the color film substrate of the $(n-1)^{th}$ batch, $\Delta TP_{TFT\to CF}(n)_{EWMA}$ is an exponentially weighted moving average offset of the compensation value of the key position of the color film substrate of the $n^{th}$ batch, $TP_{TFTFinal}(n+1)$ is the deviation value of the key position of the array substrate of the $(n+1)^{th}$ batch, and $TP_{CFFinal}(n+1)$ is deviation value of the key position of the color film substrate of the $(n+1)^{th}$ batch.

The measurement data extracted and filtered by the first data extraction and filtering of the data filtering sub-module is used to calculate and finally obtain the compensation value of the key position of the color film substrate of the $(n+1)^{th}$ batch above. Next, measurement data extracted and filtered by the second data extraction and filtering of the data filtering sub-module and the calculated compensation value of the key position of the color film substrate of the $(n+1)^{th}$ batch above will be used to calculate and finally obtain the compensation value of the exposure parameter of the black matrix on the color film substrate of the $(n+1)^{th}$ batch.

If the deviation value of the key position of the color film substrate of the $n^{th}$ batch and the deviation value of the key position of the black matrix on the color film substrate of the $n^{th}$ batch are within the standard value range of the deviation value of the key position, the compensation value of the exposure parameter of the black matrix on the color film substrate of the $(n+1)^{th}$ batch is obtained by following calculation processes and the calculation result is stored in the local database:

$$\Delta TP_{Final\to BM}(n)=TP_{CFFinal}(n)-TP_{CFBM}(n)$$

$$\Delta TP_{Final\to BM}(n)_{EWMA}=(1-\alpha)\Delta TP_{Final\to BM}(n-1)_{EWMA}+\alpha\Delta TP_{Final\to BM}(n),\ 0\leq\alpha\leq1;$$

$$TP_{CFBM}(n+1)=TP_{CFFinal}(n+1)-\Delta TP_{Final\to BM}(n)_{EWMA},\ n=1,2,3,\ldots.$$

If the deviation value of the key position of the color film substrate of the $n^{th}$ batch or the deviation value of the key position of the black matrix on the color film substrate of the $n^{th}$ batch is beyond the standard value range of the deviation value of the key position, the compensation value of the exposure parameter of the black matrix on the color film substrate of the $(n+1)^{th}$ batch is obtained by the following calculation process and the calculation result is stored in the local database:

$$TP_{CFBM}(n+1)=TP_{CFFinal}(n+1)-\Delta TP_{Final\to BM}(n-1)_{EWMA},\ n=1,2,3,$$

wherein $TP_{CFFinal}(n)$ is the deviation value of the key position of the color film substrate of the $n^{th}$ batch, $TP_{CFBM}(n)$ is the deviation value of the key position of the black matrix on the color film substrate of the $n^{th}$ batch, $\Delta TP_{Final\to BM}(n)$ is an offset of the compensation value of the black matrix and the color film substrate of the $n^{th}$ batch, $\Delta TP_{Final \to BM}(n-1)_{EWMA}$ is the exponentially weighted moving average offset of the compensation value of the key position of the black matrix on the color film substrate of the $(n-1)^{th}$ batch, $\Delta TP_{Final \to BM}(n)_{EWMA}$ is the exponentially weighted moving average offset of the compensation value of the key position of the black matrix on the color film substrate of the $n^{th}$ batch, and $TP_{CFBM}(n+1)$ is the compensation value of the exposure parameter of the black matrix on the second substrate of the $(n+1)^{th}$ batch. In addition, $\alpha$ involved in the above formula is a practical empirical value. In practical applications, the value of $\alpha$ may be 0.3.

In particular, the above-mentioned calculation process uses the historical measurement data of batches and a steady optimization process control algorithm, namely, the exponential weighted moving average algorithm, to calculate the deviation compensation value of the overall correspondingly matched key position of the color film substrate in real time. Then, a compensation value of an exposure parameter of black matrix process of a color film substrate is calculated by using the overall compensation value of the color film substrate. In this way, by predicting the alignment deviation of the color film substrate and the array substrate, its optimized feedback is compensated in the preparation process to eliminate the alignment deviation, which may fundamentally solve the alignment defect, improve quality of the product, at the same time, it may save a lot of human consumption, and meet continuous production needs of an automated production line. The historical data is added during calculation in the exponentially weighted moving average algorithm, which may guarantee the calculated parameters of the apparatus are continuity and stability in a certain period of time, thus ensuring the stability of the product quality.

In a specific embodiment, in the above compensating system for cell assembly precision provided by the above embodiment of the present disclosure, the data applying module may be configured to: match the identification data of the array substrate with the identification data of the color film substrate to be manufactured; and based on the matching result, transmit the compensation value of the exposure parameter in the local database corresponding to the matching result to an exposure apparatus for manufacturing the color film substrate. Specifically, the data applying module is responsible for data interaction with the apparatus. The data applying module may pair the Glass ID of the array substrate and the Glass ID of the color film substrate and bind the relationship therebetween. The compensation value of the exposure parameter of the black matrix on the color film substrate to be manufactured is transmitted to an exposure apparatus for manufacturing the color film substrate based on the matching result. Then, the color film will be manufactured based on the parameter, such that the alignment compensation may be completed in the manufacturing process.

The embodiments of the present disclosure provide a compensating method and system for cell assembly precision. The compensating method for cell assembly precision includes: acquiring and storing identification data and measurement data of the array substrate and the color film substrate of each batch and storing them in a local database, wherein the measurement data includes a deviation value of a key position of the array substrate of each batch, a deviation value of a key position of the color film substrate of each batch, a deviation value of a key position of the black matrix on the color film substrate of each batch, and a measurement value of alignment precision after alignment of the array substrate and the color film substrate; calculating the acquired measurement data and determining a compensation value of an exposure parameter of the black matrix on the second substrate to be manufactured and storing it in the local database; transmitting the compensation value of the exposure parameter in the local database corresponding to the color film substrate to be manufactured to an exposure apparatus for manufacturing the color film substrate.

Specifically, in the present disclosure, according to a deviation value of a key position of a measured array substrate, a compensation value of an exposure parameter of black matrix process of a color film substrate is calculated in real time by using historical measurement data of batches. The compensation value is fed back to a manufacturing apparatus in real time. The manufacturing apparatus corrects the key parameter of the apparatus timely according to the compensation value of the exposure parameter of the black matrix, to manufacture a color film substrate matching with the array substrate. In this way, by predicting the alignment deviation of the color film substrate and the array substrate, its optimized feedback is compensated in the preparation process to eliminate the alignment deviation, which may fundamentally solve the alignment defect, improve quality of the product, at the same time, it may save a lot of human consumption, and meet continuous production needs of an automated production line.

It will be apparent to those skilled in the art that various changes and modifications may be made in this disclosure without departing from the spirit and scope of the present disclosure. The present disclosure is intended to embrace such variations and variations if these modifications and variations of this disclosure are within the scope of the present disclosure and the equivalents thereof.

What is claimed is:

1. A compensating method for cell assembly of a first substrate and a second substrate, wherein a black matrix is provided on the second substrate, the method comprising:

acquiring, by a data acquiring unit of a compensating apparatus, identification data and measurement data of the first substrate and the second substrate of each batch, wherein the measurement data comprises a deviation value of a key position of the first substrate of each batch, a deviation value of a key position of the second substrate of each batch, a deviation value of a key position of the black matrix on the second substrate of each batch, and a measurement value of alignment precision after alignment of the first substrate and the second substrate;

calculating, by a controller of the compensating apparatus, the acquired measurement data and determining, by the controller of the compensating apparatus, a compensation value of an exposure parameter of the black matrix on the second substrate to be manufactured; and preparing, by an exposure apparatus, the second substrate to be manufactured by using an exposure parameter compensated by the compensation value of the exposure parameter.

2. The compensating method according to claim 1, wherein the step of calculating the acquired measurement data and determining a compensation value of an exposure parameter of the black matrix on the second substrate to be manufactured comprises:

extracting measurement data for calculating the compensation value of the exposure parameter of the black matrix on the second substrate to be manufactured, setting a standard value range of the deviation value of the key position and a standard value range of alignment precision corresponding to the first substrate and the second substrate, judging whether the measurement data for calculation is within a standard value range according to the standard value range of the deviation value of the key position and the standard value range of alignment precision, and outputting a judging result; and calculating the extracted measurement data, and calculating the compensation value of the exposure parameter of the black matrix on the second substrate to be manufactured according to the judging result.

3. The compensating method according to claim 2, wherein the step of extracting measurement data for calculating the compensation value of the exposure parameter of the black matrix on the second substrate to be manufactured, setting a standard value range of the deviation value of the key position and a standard value range of alignment precision corresponding to the first substrate and the second substrate, and judging whether the measurement data for calculation is within a standard value range according to the standard value range of the deviation value of the key position and the standard value range of alignment precision, and outputting a judging result comprises:

a first data extraction and filtering: extracting the deviation value of the key position of the first substrate of the $(n+1)^{th}$ batch, an exponentially weighted moving average offset of the compensation value of the key position of the second substrate of the $(n-1)^{th}$ batch, the deviation value of the key position of the first substrate and the second substrate of the $n^{th}$ batch, judging whether the extracted deviation value of the key position of the first substrate and the second substrate of the $n^{th}$ batch and the measurement value of alignment precision after forming a cell assembly of the first substrate and the second substrate of the $n^{th}$ batch are within the standard value range according to the standard value range of the deviation value of the key position and the standard value range of alignment precision, and outputting the judging result; and a second data extraction and filtering: extracting the deviation value of the key position of the second substrate of the $n^{th}$ batch, the deviation value of the key position of the black matrix on the second substrate of the $n^{th}$ batch, an exponentially weighted moving average offset of the compensation value of the key position of the black matrix on the second substrate of the $(n-1)^{th}$ batch, judging whether the extracted deviation value of the key position of the second substrate of the $n^{th}$ batch the and the extracted deviation value of the key position of the black matrix on the second substrate of the $n^{th}$ batch are within the standard value range according to the standard value range of the deviation value of the key position, and outputting the judging result.

4. The compensating method according to claim 3, wherein the step of calculating the acquired measurement data, and calculating the compensation value of the exposure parameter of the black matrix on the second substrate to be manufactured according to the judging result comprises:

if the deviation value of the key position of the first substrate and the second substrate of the $n^{th}$ batch is within the standard value range of the deviation value of the key position and the measurement values of alignment precision after forming a cell assembly of the first substrate and the second substrate of the $n^{th}$ batch are within the standard value range of alignment precision, obtaining the compensation value of the key position of the second substrate of the $(n+1)^{th}$ batch by following calculation processes:

$$\Delta TP_{TFT \to CF}(n) = TP_{TFTFinal}(n) - TP_{CFFinal}(n);$$

$$\Delta TP_{TFT \to CF}(n)_{EWMA} = (1-\alpha)\Delta TP_{TFT \to CF}(n-1)_{EWMA} + \alpha \Delta TP_{TFT \to CF}(n), 0 \le \alpha \le 1;$$

$$TP_{CFFinal}(n+1) = TP_{TFTFinal}(n+1) + \Delta TP_{TFT \to CF}(n)_{EWMA}, n=1,2,3,\ldots$$

if the deviation value of the key position of the first substrate and the second substrate of the $n^{th}$ batch is beyond the standard value range of the deviation value of the key position, or the measurement values of alignment precision after forming a cell assembly of the first substrate and the second substrate of the $n^{th}$ batch are beyond the standard value range of alignment precision, obtaining the compensation value of the key position of the second substrate of the $(n+1)^{th}$ batch by the following calculation process:

$$TP_{CFFinal}(n+1) = TP_{TFTFinal}(n+1) + \Delta TP_{TFT \to CF}(n-1)_{EWMA}, n=1,2,3,\ldots$$

wherein $T_{PTFTFinal}(n)$ is the deviation value of the key position of the first substrate of the $n^{th}$ batch, $TP_{TFTFinal}(n)$ is the deviation value of the key position of the second substrate of the $n^{th}$ batch, $\Delta TP_{TFT \to CF}(n)$ is an offset of the compensation value of the first substrate and the second substrate of the $n^{th}$ batch, $\Delta TP_{TFT \to CF}(n-1)_{EWMA}$ is the exponentially weighted moving average offset of the compensation value of the key position of the second substrate of the $(n-1)^{th}$ batch, $\Delta TP_{TFT \to CF}(n)_{EWMA}$ is an exponentially weighted moving average offset of the compensation value of the key position of the second substrate of the $n^{th}$ batch, $\mathrm{ITP}_{TFTFinal}(n+1)$ is the deviation value of the key position of the first substrate of the $(n+1)^{th}$ batch, and $TP_{CFFinal}(n+1)$ is deviation value of the key position of the second substrate of the $(n+1)^{th}$ batch;

if the deviation value of the key position of the second substrate of the $n^{th}$ batch and the deviation value of the key position of the black matrix on the second substrate of the $n^{th}$ batch are within the standard value range of the deviation value of the key position, obtaining the compensation value of the exposure parameter of the black matrix on the second substrate of the $(n+1)^{th}$ batch by following calculation processes:

$$\Delta TP_{Final \to BM}(n) = TP_{CFFinal}(n) - TP_{CFBM}(n);$$

$$\Delta TP_{Final \to BM}(n)_{EWMA} = (1-\alpha)\Delta TP_{Final \to BM}(n-1)_{EWMA} + \alpha \Delta TP_{Final \to BM}(n), 0 \le \alpha \le 1;$$

$$TP_{CFBM}(n+1) = TP_{CFFinal}(n+1) - \Delta TP_{Final \to BM}(n)_{EWMA}, n=1,2,3,\ldots$$

if the deviation value of the key position of the second substrate of the $n^{th}$ batch or the deviation value of the key position of the black matrix on the second substrate of the $n^{th}$ batch is beyond the standard value range of the deviation value of the key position, obtaining the compensation value of the exposure parameter of the black matrix on the second substrate of the $(n+1)^{th}$ batch by the following calculation process:

$$TP_{CFBM}(n+1) = TP_{CFFinal}(n+1) - \Delta TP_{Final \to BM}(n)_{EWMA}, n=1,2,3,\ldots$$

wherein $TP_{CFFinal}(n)$ is the deviation value of the key position of the second substrate of the $n^{th}$ batch, $TP_{CFBM}(n)$ is the deviation value of the key position of the black matrix on the second substrate of the $n^{th}$ batch, $\Delta TP_{Final \to BM}(n)$ is an offset of the compensation value of the black matrix and the second substrate of the $n^{th}$ batch, $\Delta TP_{Final \to BM}(n-1)_{EWMA}$ is the exponentially weighted moving average offset of the compensation value of the key position of the black matrix on the second substrate of the $(n-1)^{th}$ batch, $\Delta TP_{Final \to BM}(n)_{EWMA}$ is the exponentially weighted moving average offset of the compensation value of the key position of the black matrix on the second substrate of the $n^{th}$ batch, and $TP_{CFBM}(n+1)$ is the compensation value of the exposure parameter of the black matrix on the second substrate of the (n+1)th batch.

5. The compensating method according to claim 1, wherein the step of preparing the manufactured second substrate by using an exposure parameter compensated by the compensation value of the exposure parameter comprises:
   matching the identification data of the first substrate with the identification data of the second substrate to be manufactured; and
   based on the matching result, preparing the second substrate to be manufactured by using an exposure parameter compensated by the compensation value of the exposure parameter corresponding to the matching result.

6. The compensating method of claim 5, wherein the identification data comprises at least one of a product batch, a product model and a product size.

7. The compensating method according to claim 1, wherein the first substrate comprises an array substrate, and the second substrate comprises a color film substrate.

8. The compensating method according to claim 1, wherein the acquired measurement data and the determined compensation values of the exposure parameters are stored in a database.

9. The compensating method according to claim 8, wherein the database comprises at least one of a local database and a network database.

10. The compensating method according to claim 1, wherein the step of preparing the manufactured second substrate by using an exposure parameter compensated by the compensation value of the exposure parameter comprises:
   transmitting the compensation value of the exposure parameter to an exposure apparatus for manufacturing the second substrate; and
   the exposure apparatus obtaining a compensated exposure parameter by using the compensation value of the exposure parameter and preparing the second substrate by using the compensated exposure parameter.

11. A compensating system for cell assembly, comprising: a data acquiring circuit, a data analyzing circuit and a data applying circuit,
   wherein the data acquiring circuit is configured to acquire identification data and measurement data of the first substrate and the second substrate of each batch, wherein the measurement data comprises a deviation value of a key position of the first substrate of each batch, a deviation value of a key position of the second substrate of each batch, a deviation value of a key position of the black matrix on the second substrate of each batch, and a measurement value of alignment precision after alignment of the first substrate and the second substrate;
   the data analyzing circuit is configured to calculate the measurement data acquired by the data acquiring circuit and determining a compensation value of an exposure parameter of the black matrix on the second substrate to be manufactured; and
   the data applying circuit is configured to prepare the second substrate to be manufactured by using an exposure parameter compensated by the compensation value of the exposure parameter.

12. The compensating system for cell assembly precision according to claim 11, wherein the data analyzing circuit comprises: a data filtering sub-circuit and a data calculating sub-circuit,
   wherein the data filtering sub-circuit is configured to extract measurement data for calculating the compensation value of the exposure parameter of the black matrix on the second substrate to be manufactured, set a standard value range of the deviation value of the key position and a standard value range of alignment precision corresponding to the first substrate and the second substrate, judge whether the measurement data for calculation is within a standard value range according to the standard value range of the deviation value of the key position and the standard value range of alignment precision, and output a judging result to the data calculating sub-circuit; and
   the data calculating sub-circuit is configured to calculate the measurement data extracted by the data filtering sub-circuit, and calculate the compensation value of the exposure parameter of the black matrix on the second substrate to be manufactured according to the judging result of the data filtering sub-circuit.

13. The compensating system for cell assembly precision according to claim 12, wherein the data filtering sub-circuit is configured to:
   a first data extraction and filtering: extract the deviation value of the key position of the first substrate of the $(n+1)^{th}$ batch, an exponentially weighted moving average offset of the compensation value of the key positions of the second substrate of the $(n-1)^{th}$ batch, the deviation value of the key position of the first substrate and the second substrate of the $n^{th}$ batch, judge whether the extracted deviation value of the key position of the first substrate and the second substrate of the $n^{th}$ batch and the measurement value of alignment precision after forming a cell assembly of the first substrate and the second substrate of the $n^{th}$ batch are within the standard value range according to the standard value range of the deviation value of the key position and the standard value range of alignment precision, and output the judging result to the data calculating sub-circuit; and
   a second data extraction and filtering for: extract the deviation value of the key position of the second substrate of the $n^{th}$ batch, the deviation value of the key position of the black matrix on the second substrate of the $n^{th}$ batch, an exponentially weighted moving average offset of the compensation value of the key position of the black matrix on the second substrate of the $(n-1)^{th}$ batch, judge whether the extracted deviation value of the key position of the second substrate of the $n^{th}$ batch the and the extracted deviation value of the key position of the black matrix on the second substrate of the $n^{th}$ batch are within the standard value range according to the standard value range of the deviation value of the key position, and output the judging result to the data calculating sub-circuit.

14. The compensating system for cell assembly precision according to claim 13, wherein the data calculating sub-circuit is configured to:

if the deviation value of the key position of the first substrate and the second substrate of the $n^{th}$ batch is within the standard value range of the deviation value of the key position and the measurement values of alignment precision after forming a cell assembly of the first substrate and the second substrate of the $n^{th}$ batch are within the standard value range of alignment precision, obtain the compensation value of the key position of the second substrate of the $(n+1)^{th}$ batch by following calculation processes:

$\Delta TP_{TFT \to CF}(n) = TP_{TFTFinal}(n) - TP_{CFFinal}(n);$ $\Delta TP_{TFT \to CF}(n)_{EWMA} = (1-\alpha)\Delta TP_{TFT \to CF}(n-1)_{EWMA} + \alpha \Delta TP_{TFT \to CF}(n), 0 \le \alpha \le 1;$ $TP_{CFFinal}(n+1) = TP_{TFTFinal}(n+1) - \Delta TP_{TFT \to CF}(n)_{EWMA}, n=1,2,3,\ldots$ if the deviation value of the key position of the first substrate and the second substrate of the $n^{th}$ batch is beyond the standard value range of the deviation value of the key position, or the measurement values of alignment precision after forming a cell assembly of the first substrate and the second substrate of the $n^{th}$ batch are beyond the standard value range of alignment precision, obtain the compensation value of the key position of the second substrate of the $(n+1)^{th}$ batch by the following calculation process:

$TP_{CFFinal}(n+1) = TP_{TFTFinal}(n+1) - \Delta TP_{TFT \to CF}(n)_{EWMA}, n=1,2,3,\ldots$ wherein $TP_{TFTFinal}(n)$ is the deviation value of the key position of the first substrate of the $n^{th}$ batch, $TP_{CFFinal}(n)$ is the deviation value of the key position of the second substrate of the $n^{th}$ batch, $\Delta TP_{TFT \to CF}(n)$ is an offset of the compensation value of the first substrate and the second substrate of the $n^{th}$ batch, $\Delta TP_{TFT \to CF}(n-1)_{EWMA}$ is the exponentially weighted moving average offset of the compensation value of the key position of the second substrate of the $(n-1)^{th}$ batch, $\Delta TP_{TFT \to CF}(n)_{EWMA}$ is an exponentially weighted moving average offset of the compensation value of the key position of the second substrate of the $n^{th}$ batch, $ITP_{TFTFinal}(n+1)$ is the deviation value of the key position of the first substrate of the $(n+1)^{th}$ batch, and $TP_{CFFinal}(n+1)$ is deviation value of the key position of the second substrate of the $(n+1)^{th}$ batch;

if the deviation value of the key position of the second substrate of the $n^{th}$ batch and the deviation value of the key position of the black matrix on the second substrate of the $n^{th}$ batch are within the standard value range of the deviation value of the key position, obtain the compensation value of the exposure parameter of the black matrix on the second substrate of the $(n+1)^{th}$ batch by following calculation processes:

$\Delta TP_{Final \to BM}(n) = TP_{CFFinal}(n) - TP_{CFBM}(n);$ $\Delta TP_{Final \to BM}(n)_{EWMA} = (1-\alpha)\Delta TP_{Final \to BM}(n-1)_{EWMA} + \alpha \Delta TP_{Final \to BM}(n), 0 \le \alpha \le 1;$ $TP_{CFBM}(n+1) = TP_{CFFinal}(n+1) - \Delta TP_{Final \to BM}(n)_{EWMA}, n=1,2,3,\ldots$ if the deviation value of the key position of the second substrate of the $n^{th}$ batch or the deviation value of the key position of the black matrix on the second substrate of the $n^{th}$ batch is beyond the standard value range of the deviation value of the key position, obtain the compensation value of the exposure parameter of the black matrix on the second substrate of the $(n+1)^{th}$ batch by the following calculation process:

$TP_{CFBM}(n+1) = TP_{CFFinal}(n+1) - \Delta TP_{Final \to BM}(n-1)_{EWMA}, n=1,2,3,\ldots$ wherein $TP_{CFFinal}(n)$ is the deviation value of the key position of the second substrate of the $n^{th}$ batch, $TP_{CFBM}(n)$ is the deviation value of the key position of the black matrix on the second substrate of the $n^{th}$ batch, $\Delta TP_{Final \to BM}(n)$ is an offset of the compensation value of the black matrix and the second substrate of the $n^{th}$ batch, $\Delta TP_{Final \to BM}(n-1)_{EWMA}$ is the exponentially weighted moving average offset of the compensation value of the key position of the black matrix on the second substrate of the $(n-1)^{th}$ batch, $\Delta TP_{Final \to BM}(n)_{EWMA}$ is the exponentially weighted moving average offset of the compensation value of the key position of the black matrix on the second substrate of the $n^{th}$ batch, and $TP_{CFBM}(n+1)$ is the compensation value of the exposure parameter of the black matrix on the second substrate of the (n+1)th batch.

15. The compensating system for cell assembly precision according to claim 11, wherein the data applying circuit is configured to:
   match the identification data of the first substrate with the identification data of the second substrate to be manufactured; and
   based on the matching result, prepare the second substrate to be manufactured by using an exposure parameter compensated by the compensation value of the exposure parameter corresponding to the matching result.

16. The compensating system for cell assembly precision of claim 15, wherein the identification data comprises at least one of a product batch, a product model and a product size.

17. The compensating system for cell assembly precision according to claim 11, wherein the first substrate comprises an array substrate, and the second substrate comprises a color film substrate.

18. The compensating system for cell assembly precision according to claim 11, wherein the acquired measurement data and the determined compensation values of the exposure parameters are stored in a database.

19. The compensating system for cell assembly precision according to claim 18, wherein the database comprises at least one of a local database and a network database.

20. The compensating system for cell assembly precision according to claim 11, wherein the data applying circuit is configured to:
   transmit the compensation value of the exposure parameter to an exposure apparatus for manufacturing the second substrate,
      wherein the exposure apparatus obtains a compensated exposure parameter by using the compensation value of the exposure parameter and prepares the second substrate by using the compensated exposure parameter.

* * * * *